Jan. 24, 1956 D. W. HUFF 2,732,341
FILTER AND AERATOR
Filed Sept. 11, 1953
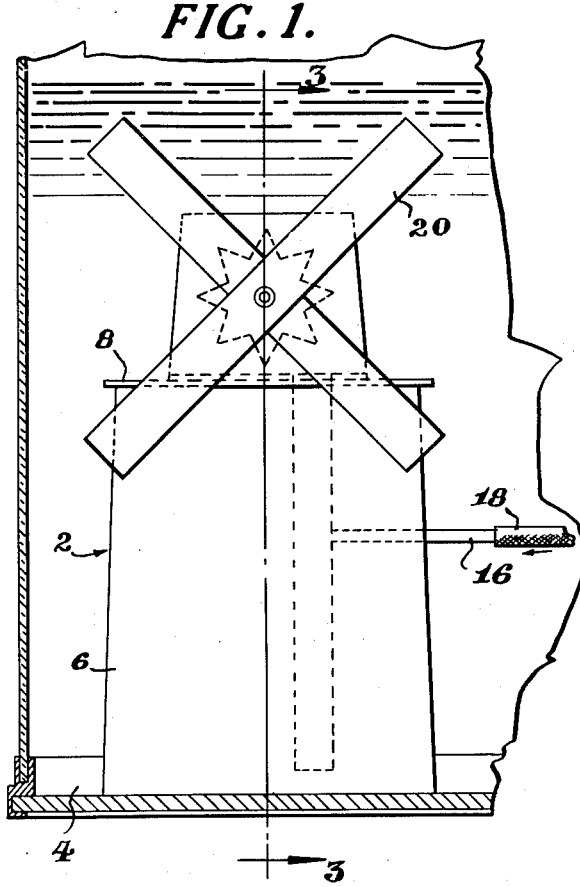
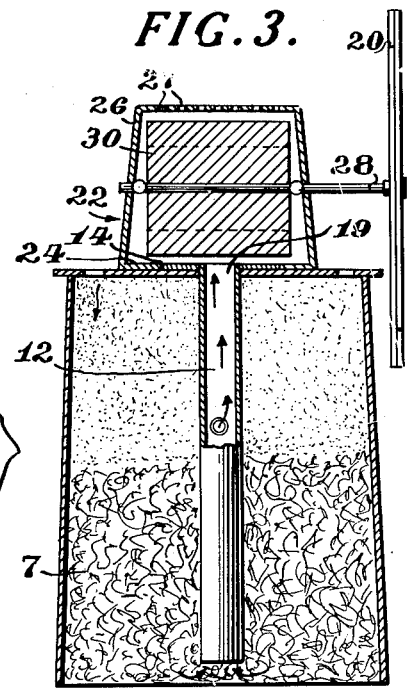
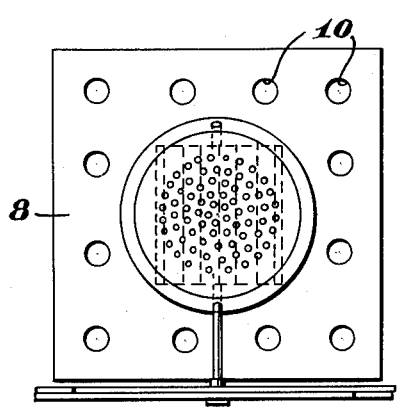
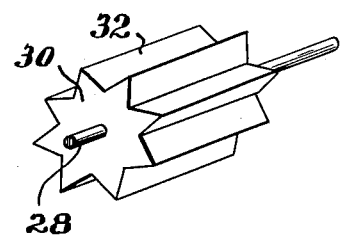
INVENTOR
Donald W. Huff
BY Cushman, Darby & Cushman
ATTORNEYS

United States Patent Office 2,732,341
Patented Jan. 24, 1956

2,732,341

FILTER AND AERATOR

Donald W. Huff, Peekskill, N. Y.

Application September 11, 1953, Serial No. 379,504

1 Claim. (Cl. 210—16)

The present invention relates to apparatus adapted for use with aquaria and the like.

The principal object of the invention is to provide a novel device for filtering and aerating aquarium water.

Another object of the invention is to provide a device of the type described above which presents a pleasing appearance when in use, is relatively simple in construction, and can be readily disassembled for cleaning purposes.

Still another object of the invention is to provide a filtering and aerating device, as described, in the form of a windmill or equivalent structure, wherein the windmill arms or the like, which, among other functions, may serve to agitate and circulate the aquarium water, are operated by water being filtered and aerated.

Other objects will be hereinafter apparent from the ensuing detailed description of the invention, as disclosed in the accompanying drawings, wherein, Figure 1 is a partial side elevational view of an aquarium provided with a device made in accordance with the present invention;

Figure 2 is a plan view of a device according to the invention;

Figure 3 is a vertical cross sectional view of the device on the line 3—3 of Figure 1; and Figure 4 is a perspective view of a part of the means used for driving the windmill arms, or their equivalent, according to the present invention.

Referring more specifically to the drawings, the device of the invention is shown in the form of a windmill 2 positioned on the bottom of an aquarium 4.

The windmill 2 comprises a filter housing or container 6 which may take any desired shape although, in the particular embodiment shown, it is substantially square. As shown, container 6 is closed at the sides but open at the bottom to permit the insertion of appropriate filtering material 7, e. g., charcoal and/or glass wool, within the container.

As will be appreciated, container 6 may be made of metal or any other suitable fabricating material, preferably a plastic material, such as Bakelite, appropriately colored to conceal the filtering material 7 within the container and otherwise provide a device of pleasing appearance.

Container 6 is also provided with an upper wall 8 having a plurality of apertures 10 therein, as best shown in Figure 2. This upper wall 8 preferably constitutes an integral part of the container 6. However, if desired, it may be a separate member which is simply laid over the upper end of the container. In the latter event, the container may, if desired, be provided with a bottom wall since the filtering material can then be placed within, and removed from, the container through the upper end thereof.

For the purpose of drawing aquarium water through the windmill of the invention, there is positioned within container 6 a longitudinally extending, tubular aerating member 12, the latter being secured to upper wall 8 by means of the flange 14. As best shown in Figure 1, this aerating member 12 includes a side arm 16 which projects outwardly through container 6 to receive an air hose 18 from an air pump (not shown) of conventional design. By this arrangement, air pumped into member 12 draws aquarium water into the lower end of member 12 in the direction of the arrows in Figure 3. In this way, the partially aerated water is pulled through member 12 and sprayed through the exit 19 onto the driving and agitating member 30 for further aeration. The water withdrawn from container 6 and aerated as described is replaced by additional aquarium water drawn downwardly through the openings 10 and filtering material 7 the thus filtered water then passing into the lower end of the aerating member and upwardly therethrough in the manner referred to above.

According to the invention, the air and water spray expelled through exit 19 of the aerating member 12 is used to actuate windmill blades 20 which, in turn, serve a number of purposes, e. g., they provide a device of pleasing appearance, they indicate whether or not the device is in operation, and, if the aquarium water is sufficiently high, they serve to agitate and circulate same. The device is provided with a windmill arm assembly 22 mounted on the upper wall of container 6. This assembly 22 may be rigidly secured to the container, if desired. Preferably, however, the assembly constitutes a separate part of the device which simply is laid upon wall 8, so that the device may be readily disassembled. Accordingly, the assembly includes a base member 24 of lead or other material sufficiently heavy to keep the assembly positioned on container 6. This base member 24 is cut to receive flange 14 when positioned on container 6 so that the mixture of water and air expelled from aerating member 12 passes into the assembly for further aeration and to drive blades 20.

As best shown in Figures 2 and 3, the assembly 22 includes a cap 26, the upper end of which is provided with a plurality of openings 27, by means of which the mixture of water and air expelled from the aerating member 12 ultimately leaves the device. Cap 26 also has mounted therein a rotatable shaft 28, one end of which extends outwardly beyond the lateral extremity of the cap to carry the windmill blades 20.

Positioned within cap 26 and mounted for rotation on shaft 28 is a driving member 30 which, as best shown in Figures 1 and 4, comprises a plurality of radially extending fins 32. As shown in Figure 1, driving and agitating member 30 is so positioned with respect to the exit end 19 of aerating member 12, that, as the mixture of air and water is expelled through exit 19, it strikes the fin 32 adjacent thereto, thus causing member 30 and the windmill arms 20 to rotate, the air and water mixture thereafter passing upwardly into the cap where further aeration is effected and then out the openings 27.

As will be appreciated from the foregoing, the device of the present invention takes advantage of the water being filtered and aerated to operate a rotatable member which, if positioned within the water, serves to agitate and insure circulation of the same. Additionally, it will be realized that the windmill arms provide a very pleasing appearance when the device is positioned within the aquarium.

It will be understood that various modifications of the invention as described herein can be made without in any way deviating from the inventive concept involved. For example, it is preferred that the device of the invention be made up of at least two parts to enable ready disassemblage and cleaning, one part comprising the housing 6, with upper wall 8 and aerating member 12, and the other part comprising the windmill arm assembly 22. However, if desired, the device may be made as a unitary structure in which, for example, the housing bottom may be left open for the insertion of filtering material. Additionally, while the present invention has been illustrated by a windmill structure, it will be understood that the windmill arms may be replaced by equivalent means, e. g., a waterwheel, operable by the filtered and aerated water. Hence, the foregoing description is not intended to limit the invention as defined in the appended claim.

I claim:

A device for filtering and aerating aquaria water comprising a filter housing having an upper end wall, a cap mounted on said end wall, the latter extending outwardly beyond said cap and being apertured to permit the passage of aquaria water into said housing, an aerating conduit within said housing adapted for connection with a source of air under pressure, said conduit having one end opening into said housing adjacent the lower end thereof and a discharge end opening into said cap whereby aquaria water may be drawn through said housing and conduit and discharged into said cap when said conduit is connected with air under pressure, means rotatably mounted in said cap for more complete agitation of the air water mixture, said means comprising a finned shaft and aperture means in said cap permitting discharge of water therefrom into the aquaria.

References Cited in the file of this patent

UNITED STATES PATENTS

| | | |
|---|---|---|
| 1,574,783 | Beth | Mar. 2, 1926 |
| 2,137,397 | Haldeman | Nov. 22, 1938 |
| 2,335,756 | Haldeman | Nov. 30, 1943 |
| 2,533,936 | Holmes et al. | Dec. 12, 1950 |
| 2,653,908 | Rodda | Sept. 29, 1953 |